United States Patent
Ono et al.

(10) Patent No.: US 11,645,450 B2
(45) Date of Patent: *May 9, 2023

(54) ANNOTATION EDITOR WITH GRAPH

(71) Applicant: International Business Machines Corporation, Armonk, NY (US)

(72) Inventors: Atsushi Ono, Tokyo (JP); Chikako Oyanagi, Tokyo (JP); Yuka Abe, Tokyo (JP); Teruki Tauchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/212,157

(22) Filed: Mar. 25, 2021

(65) Prior Publication Data
US 2021/0216703 A1    Jul. 15, 2021

Related U.S. Application Data

(63) Continuation of application No. 16/208,427, filed on Dec. 3, 2018, now Pat. No. 11,017,162.

(51) Int. Cl.
*G06F 40/106*    (2020.01)
*G06F 40/169*    (2020.01)
*G06F 3/0482*    (2013.01)

(52) U.S. Cl.
CPC .......... *G06F 40/169* (2020.01); *G06F 3/0482* (2013.01); *G06F 40/106* (2020.01)

(58) Field of Classification Search
CPC ..... G06F 40/169; G06F 40/106; G06F 3/0482
See application file for complete search history.

(56) References Cited

U.S. PATENT DOCUMENTS

| | | |
|---|---|---|
| 9,514,098 B1 | 12/2016 | Subramanya |
| 2006/0173957 A1* | 8/2006 | Robinson .............. H04L 67/104 709/204 |
| 2009/0133006 A1* | 5/2009 | Cheung .................... G06F 8/71 717/144 |
| 2014/0180901 A1 | 6/2014 | Strauss |

(Continued)

FOREIGN PATENT DOCUMENTS

WO    20180580141 A1    3/2018

OTHER PUBLICATIONS

Khan et al. (Web Based UNL Graph Editor, published 2013, pp. 1-10) (Year: 2013).*

(Continued)

*Primary Examiner* — Shahid K Khan
*Assistant Examiner* — Ahamed I Nazar
(74) *Attorney, Agent, or Firm* — VanLeeuwen & VanLeeuwen; Brian D. Welle

(57) ABSTRACT

An approach is provided in which the approach displays a graphical editor and a text editor concurrently on a display. The text editor displays a document text that includes multiple entities and the graphical editor displays multiple nodes corresponding to the multiple entities. In response to receiving a user selection on the graphical editor that selects a first one of the multiple nodes, the approach identifies, based on the document text, one or more second nodes that correspond to the first node and repositions the one or more second nodes to a second position on the graphical editor based on a first position of the first node.

20 Claims, 19 Drawing Sheets

(56) References Cited

U.S. PATENT DOCUMENTS

| | | | |
|---|---|---|---|
| 2015/0006501 A1 | 1/2015 | Talmon | |
| 2017/0083497 A1* | 3/2017 | Hosokawa | |
| 2017/0109335 A1* | 4/2017 | Lee | G06F 3/04842 |
| 2017/0344625 A1* | 11/2017 | Hosokawa | G06F 16/288 |
| 2019/0361961 A1 | 11/2019 | Zambre | |
| 2020/0175099 A1 | 6/2020 | Ono et al. | |

OTHER PUBLICATIONS

Rouane et al. (SHASS: A New Electronic Annotation Support System, Sharing in Digital Library, published 2013, pp. 1-2) (Year: 2013).*

Krause et al., "Language Resources and Annotation Tools for Cross-Sentence Relation Extraction," International Conference on Language Resources and Evaluation, May 2014, Reykjavik, Iceland, 7 pages.

IBM: List of IBM Patents or Patent Applications Treated as Related, Mar. 25, 2021, 1 page.

* cited by examiner

ANNOTATION EDITOR WITH GRAPH

BACKGROUND

A question answer system answers questions posed in a natural language format by applying advanced natural language processing, information retrieval, knowledge representation, automated reasoning, and machine learning technologies. Question answer systems differ from typical document search technologies because document search technologies generate a list of documents ranked in order of relevance based on a word query, whereas question answer systems analyze contextual details of a question expressed in a natural language and provide a precise answer to the question.

To prepare a question answer system to receive questions and provide precise answers, software developers train the question answer system by ingesting a corpus of documents from trusted, traditional sources (textbooks, journals) that include accurate information. During document ingestion, the question answer system uses annotators to add annotations to the documents that the question answer system eventually utilizes to identify and return precise answers to questions.

The annotators are an integral part of an effectively operating question answer system and also require training, such as through machine learning using ground truth. The ground truth includes entity annotations but does not include more complex annotations that "link" entities, such as co-reference annotations and relational annotations. Co-reference annotations identify two entities referring to the same entity (e.g., "Sam" and "he"). Relational annotations identify a relation between two entities (e.g., Sam ate the apple). As such, human annotators are required to manually add the link annotations to create the ground truth that is used to train the machine learning annotator.

Human annotators use annotation editors to annotate the ground truth, but today's annotation editors do not provide sufficient means for the human annotators to view the annotations throughout the entire document, thus causing difficulty in identifying identify co-references and/or relations between entities, especially when the entities are not close together in the document. As a result, the human annotator is required to scroll through the document to identify entities for which to link, which increases the risk of the human annotator missing areas in the document to add annotations.

BRIEF SUMMARY

According to one embodiment of the present disclosure, an approach is provided in which the approach displays a graphical editor and a text editor concurrently on a display. The text editor displays a document text that includes multiple entities and the graphical editor displays multiple nodes corresponding to the multiple entities. In response to receiving a user selection on the graphical editor that selects a first one of the multiple nodes, the approach identifies, based on the document text, one or more second nodes that correspond to the first node and repositions the one or more second nodes to a second position on the graphical editor based on a first position of the first node.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
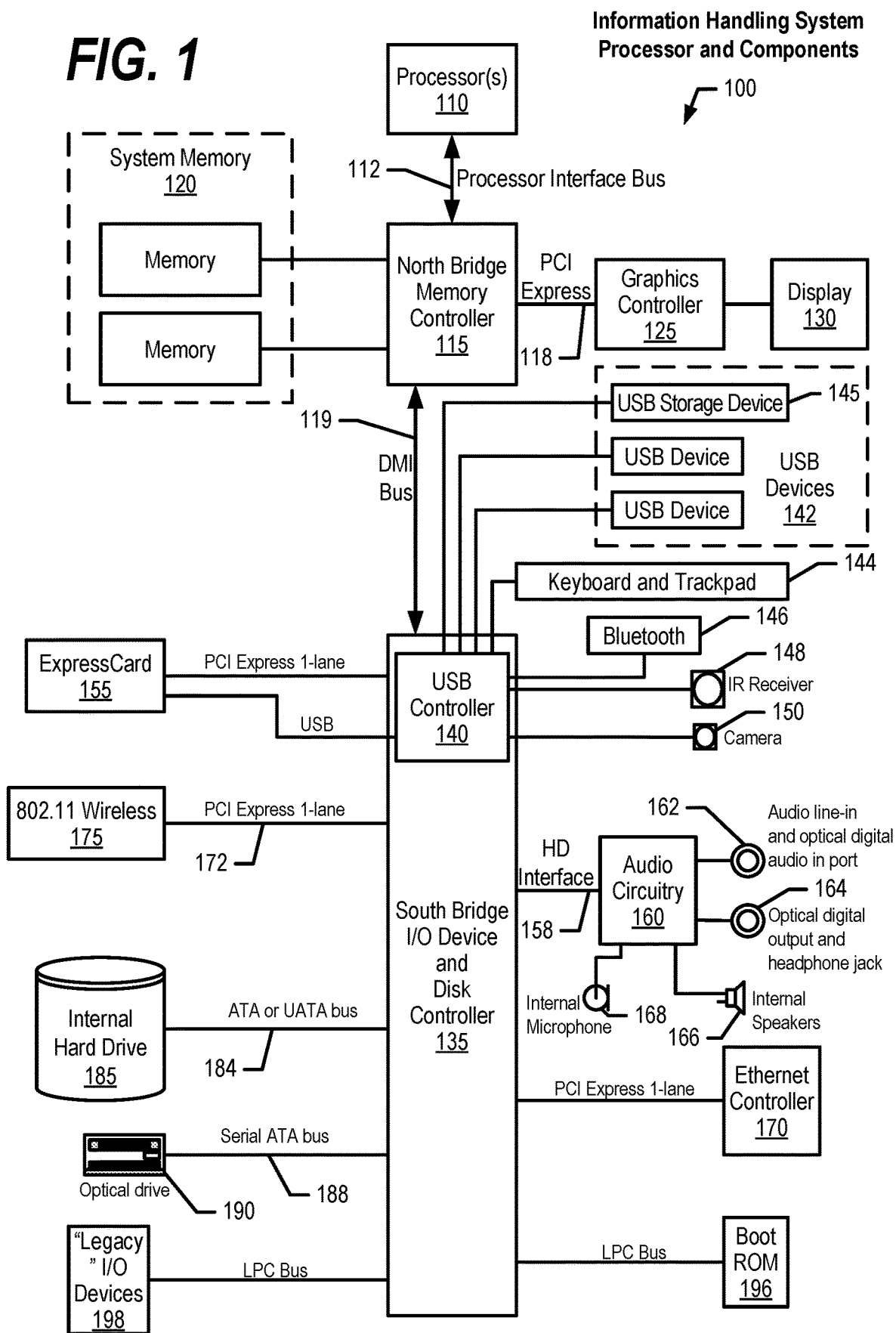
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
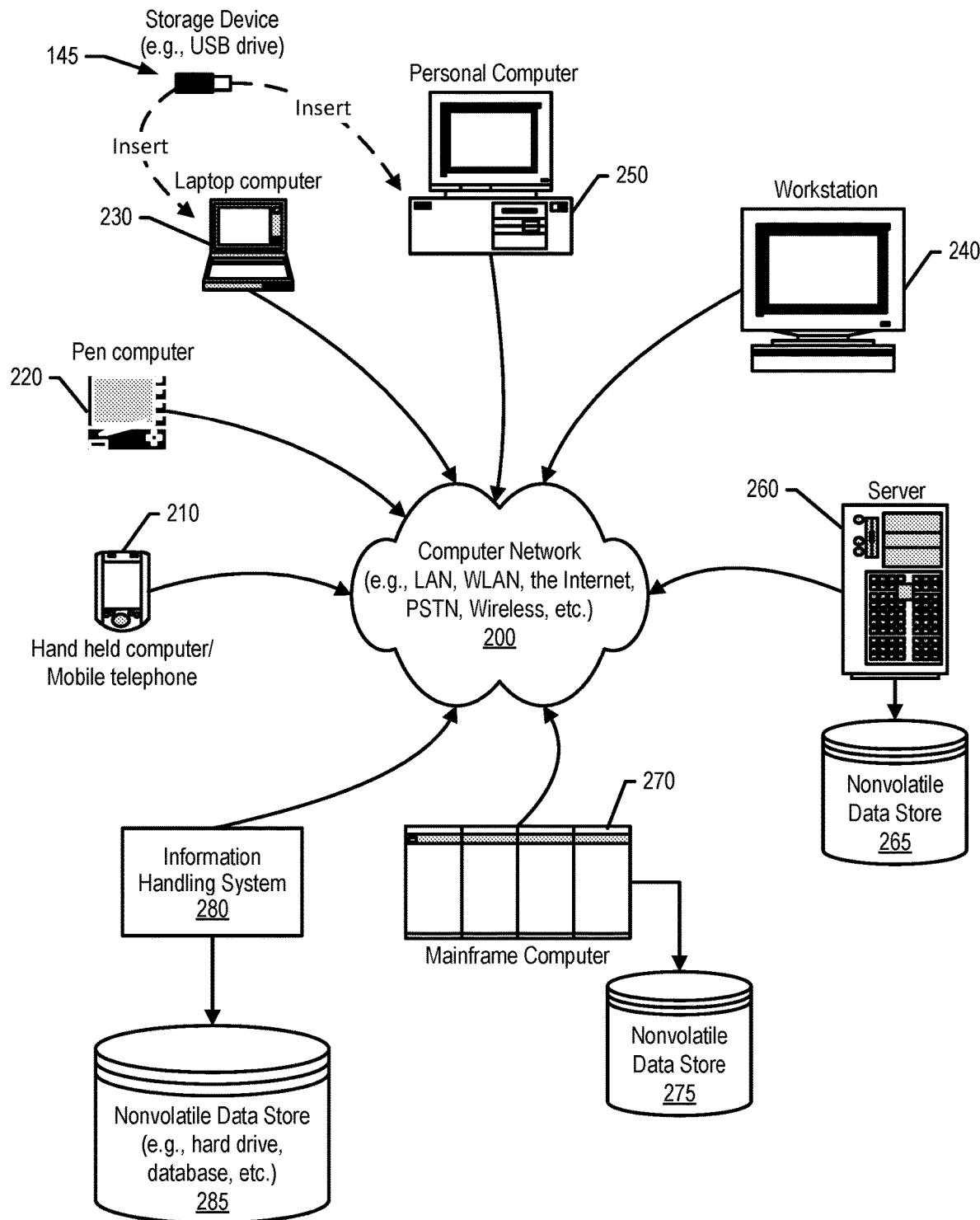
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Annotation editors are used in question answer systems as well as a wide variety of other text based mining systems. As discussed above, today's annotation editors do not provide an efficient mechanism for human annotators to annotate a large number of documents because it is difficult to identify related entities throughout the entire document, especially when the entities are not close together. The approach discussed herein concurrently displays a text-based annotation editor alongside a graph-based annotation editor and allows a human annotator to annotate documents in a more user-friendly manner. By displaying the graph-based annotation editor next to the text based annotation editor, a user can view the annotation overview of the whole document in the former while checking the sentence context in the latter. When the user performs actions such as analyzing co-references between entities or relations between entities, the graph-based annotation editor reconstructs the graph and the target nodes are moved to appropriate positions.

Benefits of the approach discussed herein include easily identifying co-references and relations, as well as the ability to graphically view co-reference chains and relations in an entire document at once. In one embodiment, the approach provides recommendations to a user regardless of an entity's position in the sentence. For example, if an annotation "he" is likely to be included in a co-reference chain, the corresponding node is placed near the co-reference chain in the graph-based annotation editor, which is difficult in a text-based annotation editor because the position of an entity is fixed in a document.

Based on annotation actions such as adding co-reference chain or relation annotations, the graph is restructured and target nodes are moved to appropriate positions. In one embodiment, nodes related to a current action move towards the center of the editor screen. In particular, nodes that are more likely to be the target of action than others are made clear in the graph, and nodes that are not used for the current annotation action are shown in the background. The text based editor and the graph based editor are synchronized so that an action in one of the editor is concurrently reflected in the other editor.

Figure 3:
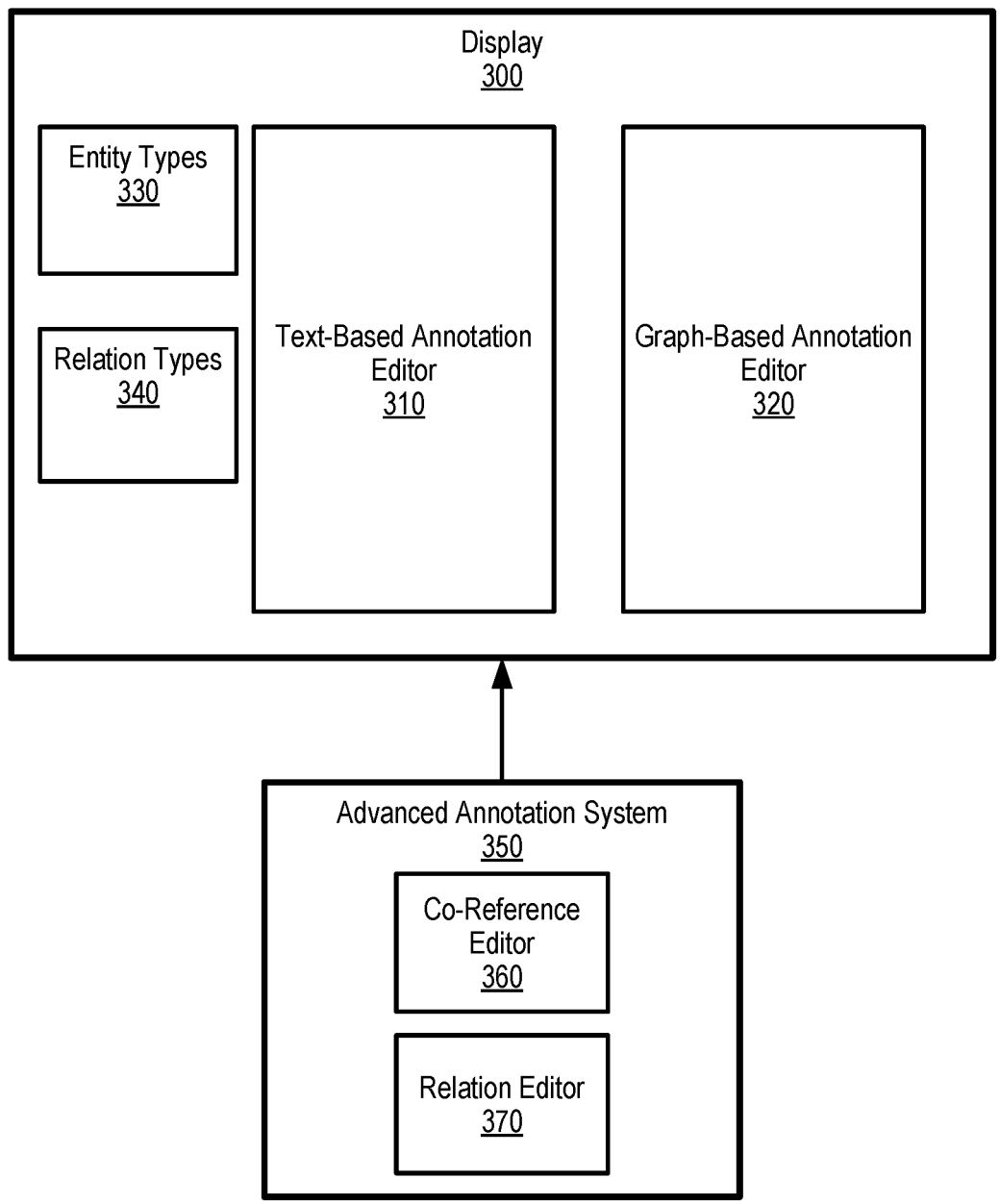
FIG. 3 is an exemplary diagram depicting an advanced annotation system interfacing with a display that enables a user to annotate a document using a text-based annotation editor and a graph-based annotation editor.

FIG. 3 is an exemplary diagram depicting an advanced annotation system interfacing with a display that enables a user to annotate a document using a text-based annotation editor and a graph-based annotation editor. Advanced annotation system 350 displays text-based annotation editor 310 and graph-based annotation editor 320 on display 300. Text-based annotation editor 310 displays document text in textual form that includes entities, and graph-based annotation editor 320 displays nodes corresponding to the entities in graphical form. In addition, advanced annotation system 350 displays entity types legend 330 and relation types selection 340 on display 300, which are discussed in more detail below.

Advanced annotation system 350 allows a user to use text-based annotation editor 310 and/or graph-based annotation editor 320 to add annotations and create a co-reference chain and/or a relation chain using co-reference editor 360 and relation editor 370. Co-reference editor 360 identifies entities to co-reference. For example, in the sentence "John bought an apple and he ate it," the terms "John" and "he" are both referring to the same entity. Relation editor 370 identifies entities having a relation. For example, in the sentence "John ate the apple," the terms "John" and "apple" are related through "ate."

When a user selects an entity in text-based annotation editor 310 or a node in graph-based annotation editor 320, the graph in graph-based annotation editor 320 is restructured in a manner that is appropriate for identifying co-reference entities or relation entities. When the user is searching for co-reference entities, co-reference editor 360 repositions candidate nodes close to the selected node that could potentially refer to the same entity so the user can easily add co-reference annotations (add to co-reference chain). If a certain expression is included in a co-reference chain, then other nodes containing the same expression are shown closer to the center node. For example, if a node representing "he" is added to the co-reference chain, other "he" nodes comes closer to the center (see FIGS. 4 through 9 and corresponding text for further details).

When the user is searching for entity relations, relation editor 370 repositions nodes on graph-based annotation editor 320 based on their particular relation, which allows the user to easily add relation annotations to the entities. In one embodiment, a user selects a relation type from relation types selection 340 and nodes that could have the selected relation is shown in the left and right side of graph-based annotation editor 320. For example, an "employedBy" relation could be made for "Person" entities with "Geo" or "Organization" entities (see FIGS. 10 through 13 and corresponding text for further details).

Figure 4:
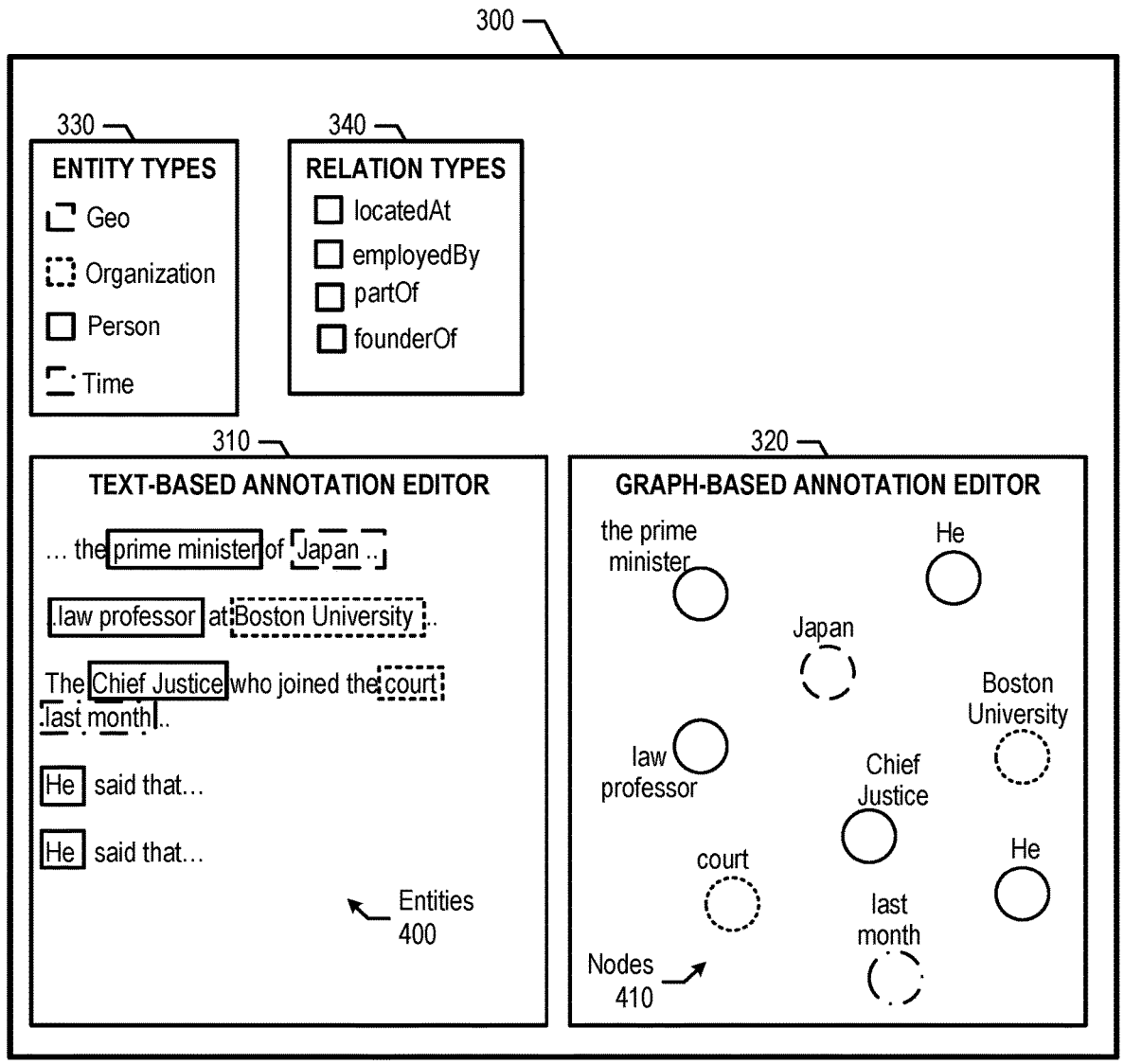
FIG. 4 is an exemplary diagram depicting a detail view of a user interface that concurrently displays a text-based annotation editor and a graph-based annotation editor.

FIG. 4 is an exemplary diagram depicting a detail view of a user interface that concurrently displays a text-based annotation editor and a graph-based annotation editor. Text-based annotation editor 310 includes entities 400 within document text that are outlined according to their entity type (e.g., solid line box, dashed line box, etc.). Entity types legend 330 indicates the various entity types.

Likewise, graph-based annotation editor 320 includes nodes 410 that correspond to entities 400 and are also outlined according their entity type. Relation types selection 340 include a list of relations in the text that are user-selectable (see FIGS. 10-19 and corresponding text for further details). As discussed in more detail below, a user may initiate a co-reference or relation process by selecting a particular entity in text-based annotation editor 310 or node in graph-based annotation editor 320. The user actions are reflected both on text-based annotation editor 310 and graph-based annotation editor 320 during the co-reference or relation process.

Figure 5:
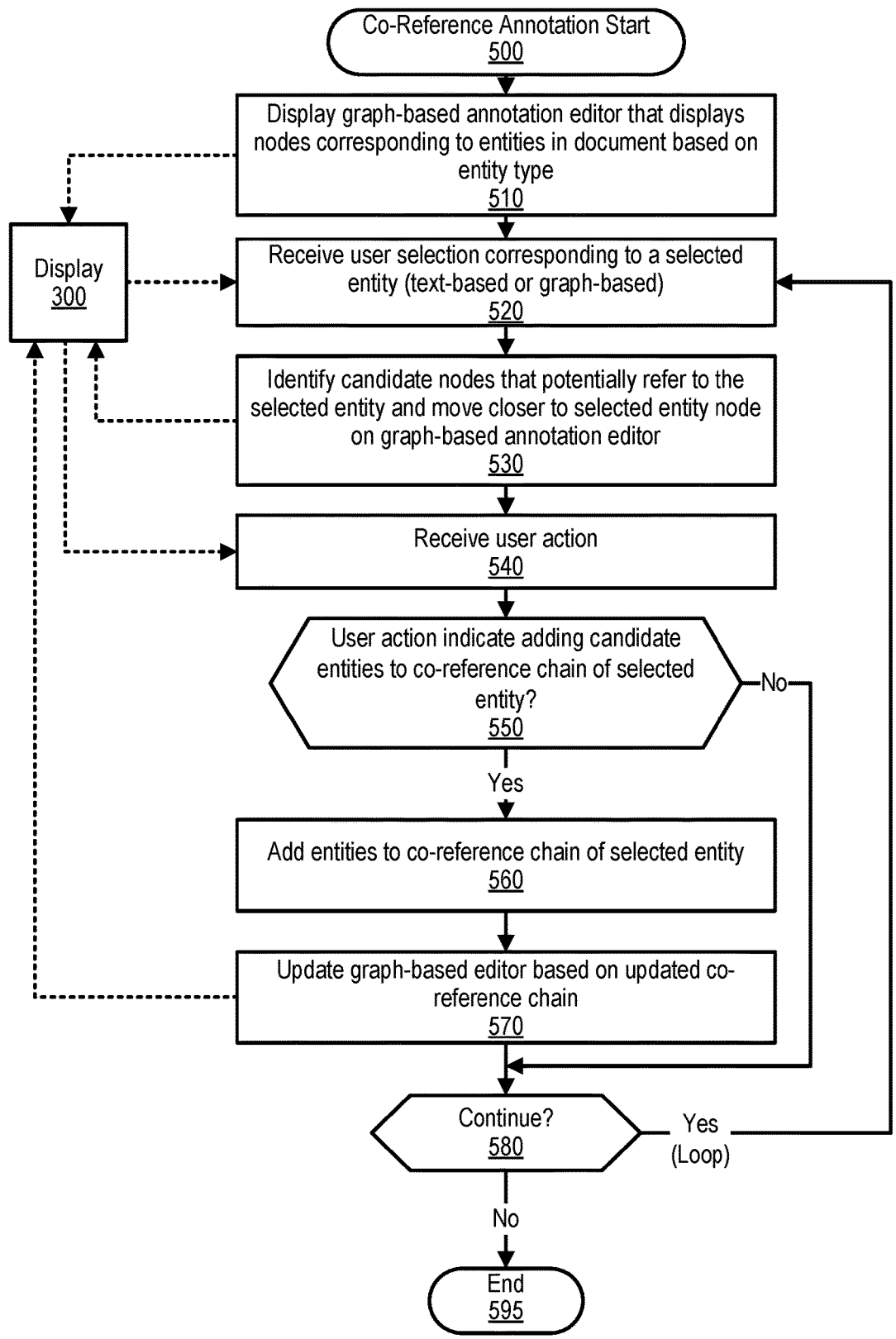
FIG. 5 is an exemplary flowchart depicting actions taken by an advanced annotation system to co-reference entities based on user selections.

FIG. 5 is an exemplary flowchart depicting actions taken by advanced annotation system 350 to co-reference entities based on user selections. FIG. 5 processing commences at 500 whereupon, at step 510, the process displays graph-based annotation editor 320 alongside text-based annotation editor 310. Text-based annotation editor 310 displays entities 400 in a document based on their entity type, and graph-based annotation editor 320 displays nodes 410 based on their corresponding entity's type.

At step 520, the process receives a user selection that corresponds to an entity. In one embodiment, the user selects an entity from text-based annotation editor 310 or a node from graph-based annotation editor 320 (see FIG. 6 and corresponding text for further details). At step 530, the process moves the entity in text-based annotation editor 310 and the node in graph-based annotation editor 320 to the center of their respective windows and identifies candidate nodes that potentially refer to the selected entity. Then, the process moves the identified candidate nodes proximate to the selected node on graph-based annotation editor 320 (see FIG. 7 and corresponding text for further details).

Figure 8:
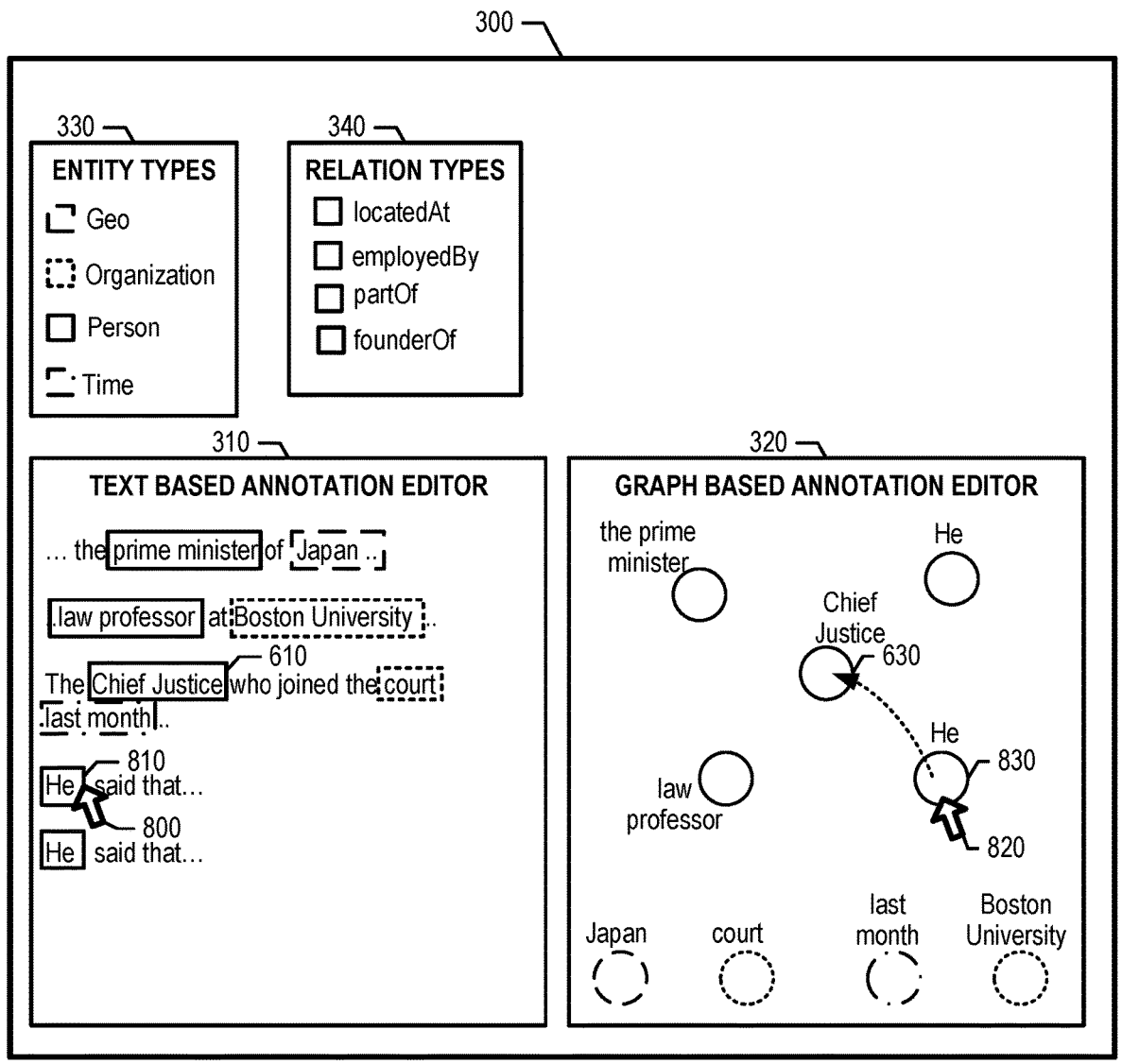
FIG. 8 is an exemplary diagram depicting a user co-referencing entities.

At step 540, the process receives a user action, such as dragging one of the candidate nodes to the selected node to indicate a co-reference (see FIG. 8 and corresponding text for further details). The process determines as to whether the user action indicates adding entities to a co-reference chain of the selected entity (decision 550). If the user action indicates adding entities to the co-reference chain of the selected entity, then decision 550 branches to the 'yes' branch whereupon, at step 560, the process adds the corresponding entities to the co-reference chain of the selected entity. At step 570, the process updates graph-based annotation editor 320 based on the updated co-reference chain (see FIG. 9 and corresponding text for further details).

On the other hand, if the user action does not indicate adding entities to the co-reference chain of the selected entity, then decision 550 branches to the 'no' branch bypassing steps 560-570. The process determines as to whether to continue (decision 580). If the process should continue, then decision 580 branches to the 'yes' branch which loops back to wait for more user selections. This looping continues until the process should terminate, at which point decision 580 branches to the 'no' branch exiting the loop. FIG. 5 processing thereafter ends at 595.

Figure 6:
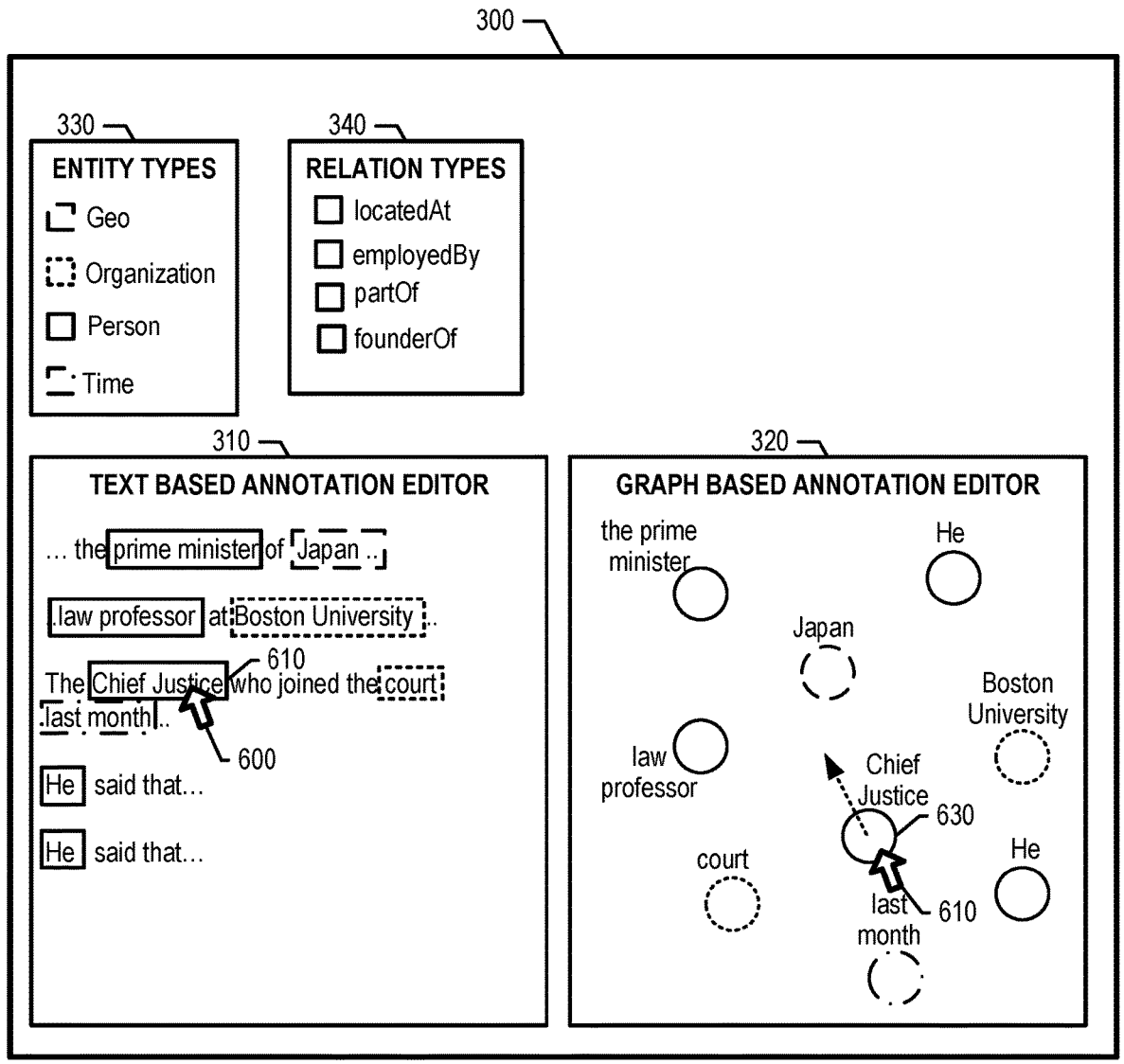
FIG. 6 is an exemplary diagram depicting a user selecting an entity or corresponding node to perform an action.

FIG. 6 is an exemplary diagram depicting a user selecting an entity or corresponding node to perform an action. As discussed herein, a user may select entities 400 in text-based annotation editor 310 (cursor 600) or nodes 410 in graph-based annotation editor 320 (cursor 610) to initiate actions. In either case, the resulting actions are reflected on both text-based annotation editor 310 and graph-based annotation editor 320.

For example, when Chief Justice entity 610 is selected using cursor 600, or Chief Justice node 630 is selected using cursor 610, graph-based annotation editor 320 moves Chief Justice node 630 to the center of graph-based annotation editor 320. This enables the user to check the context in the text while selecting other nodes in the graph to establish a co-reference (see FIG. 7 and corresponding text for further details).

Figure 7:
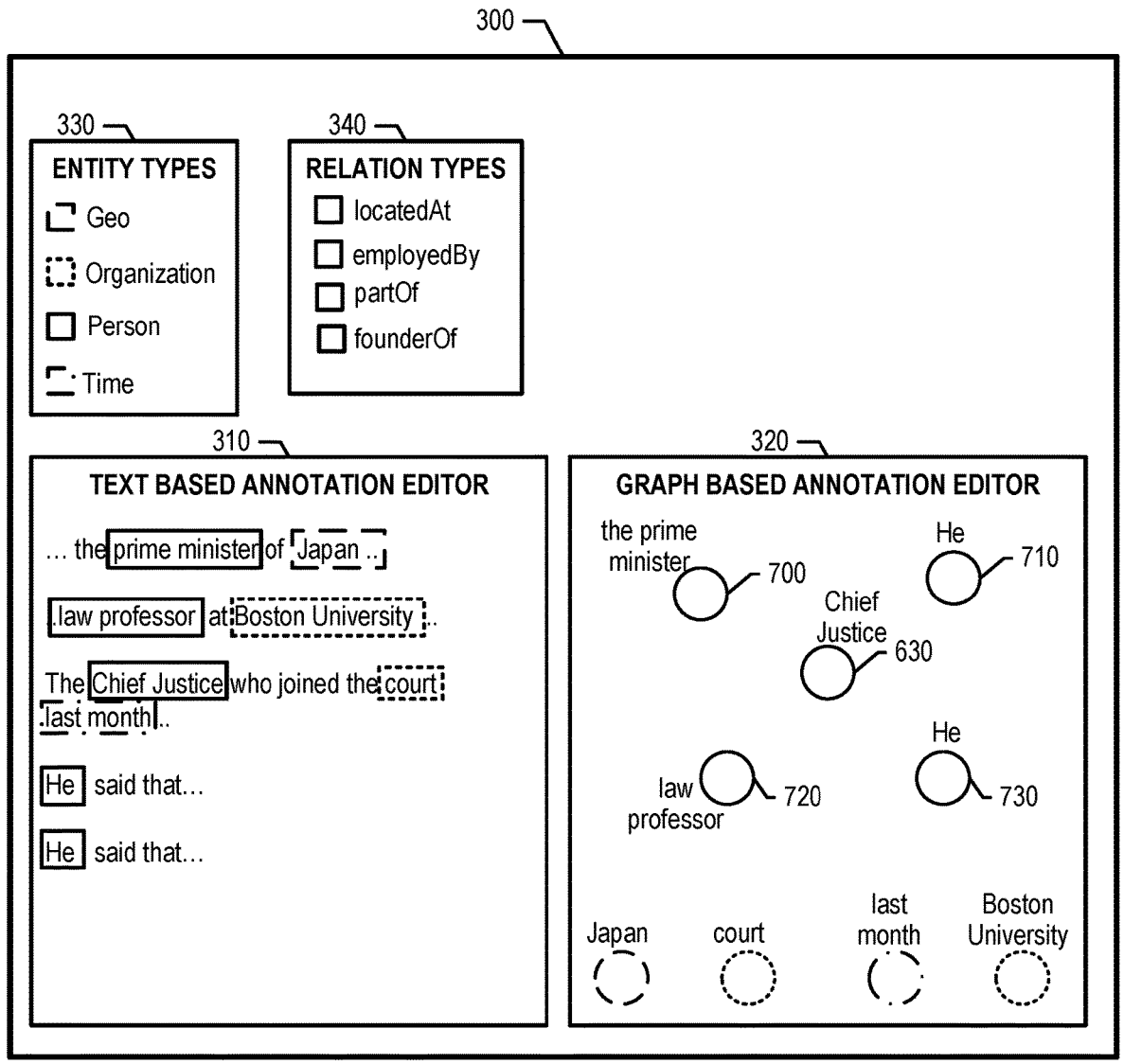
FIG. 7 is an exemplary diagram depicting candidate nodes positioned in proximity to a selected node.

FIG. 7 is an exemplary diagram depicting candidate nodes positioned in proximity to a selected node. Candidate nodes are nodes that could potentially refer to the same entity. FIG. 7 shows that graph-based annotation editor 320 positions Chief Justice node 630 in the center based on the selection from FIG. 6, and identifies candidate nodes 700, 710, 720, and 730 as possibly relating to Chief Justice node 630 based on the text document in text-based annotation editor 310. As such, graph-based annotation editor 320 positions candidate nodes 700, 710, 720, and 730 proximate to Chief Justice node 630 so that the user can easily analyze and determine which candidate nodes to co-reference to Chief Justice node 630 (see FIG. 8 and corresponding text for further details).

In one embodiment, other nodes that are not related to the selected node move away from center and shown in background so that a user can focus on annotating the co-reference chain for "Chief Justice" node 630.

FIG. 8 is an exemplary diagram depicting a user co-referencing entities. When a user selects "He" (entity 810 or node 830) in either text-based annotation editor 310 (cursor 800) or graph-based annotation editor 320 (cursor 820), the selection is immediately applied to both editors. This enables a user to check the context in the actual text while selecting nodes in graph editor.

FIG. 8 shows that the user drags and drops node 830 onto node 630, indicating a co-reference between node 630 and 830. As such, advanced annotation system 350 adds entity 810 to the co-reference chain of Chief Justice entity 610 and updates graph-based annotation editor 320 accordingly (see FIG. 9 and corresponding text for further details).

Figure 9:
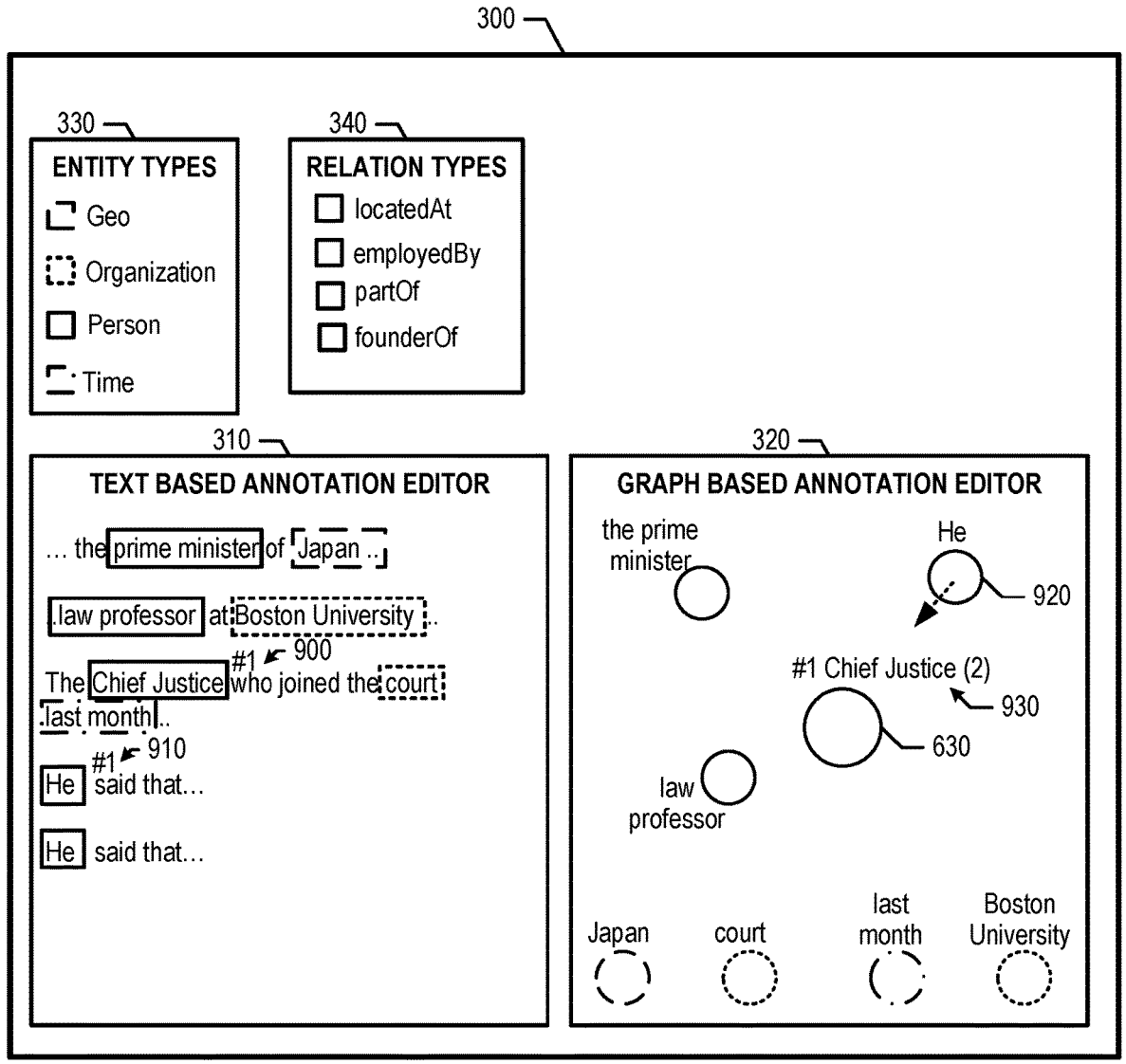
FIG. 9 is an exemplary diagram depicting a text-based annotation editor and a graph-based annotation editor displaying entity co-references.

FIG. 9 is an exemplary diagram depicting text-based annotation editor 310 and graph-based annotation editor 320 displaying entity co-references. When a user performs an action such as a node drag-and-drop to add a selected node "He" to the co-reference chain of "Chief Justice" (FIG. 8), graph-based annotation editor 320 increases the size of node 630 and indicates that two entities correspond to the larger node in title 930. In addition, a co-reference chain number "#1" is allocated to the link and shown in title 930 as well as in text-based annotation editor 310 (900 and 910). Then, graph-based annotation editor 320 moves nodes that contain the same expression as the added node, in this case "he" node 920, closer to the center in graph-based annotation editor 320 for subsequent co-referencing.

Figure 10:
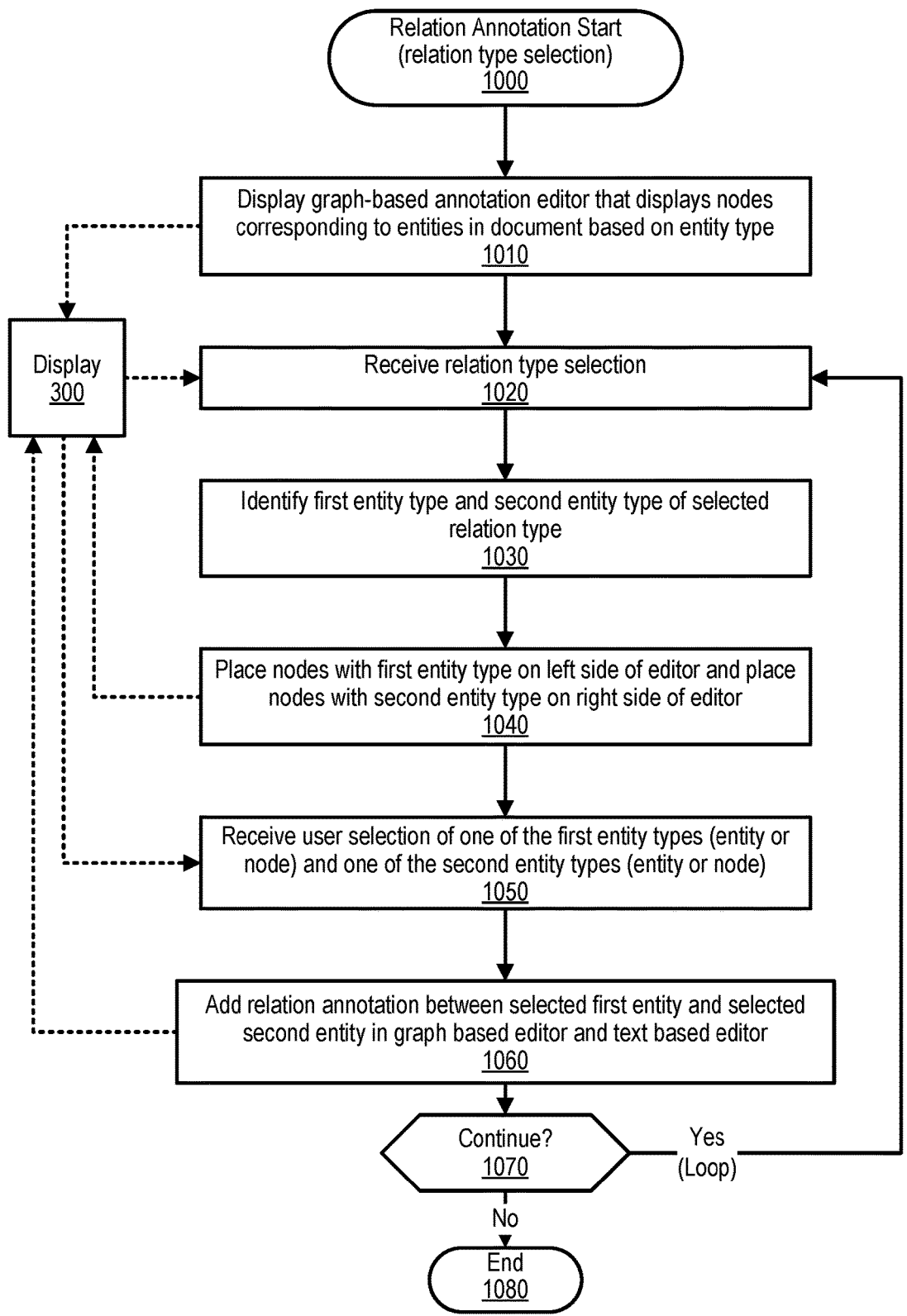
FIG. 10 is an exemplary flowchart depicting steps taken by an advanced annotation system to add relation annotations when a user selects a relation type.

FIG. 10 is an exemplary flowchart depicting steps taken by advanced annotation system 350 to add relation annotations when a user selects a relation type. FIG. 10 processing commences at 1000 whereupon, at step 1010, the process displays graph-based annotation editor 320 that displays nodes corresponding to entities in a document based on their entity type. At step 1020, the process receives a user input corresponding to a relation type selection from relation types selection 340 (see FIG. 11 and corresponding text for further details).

Figure 11:
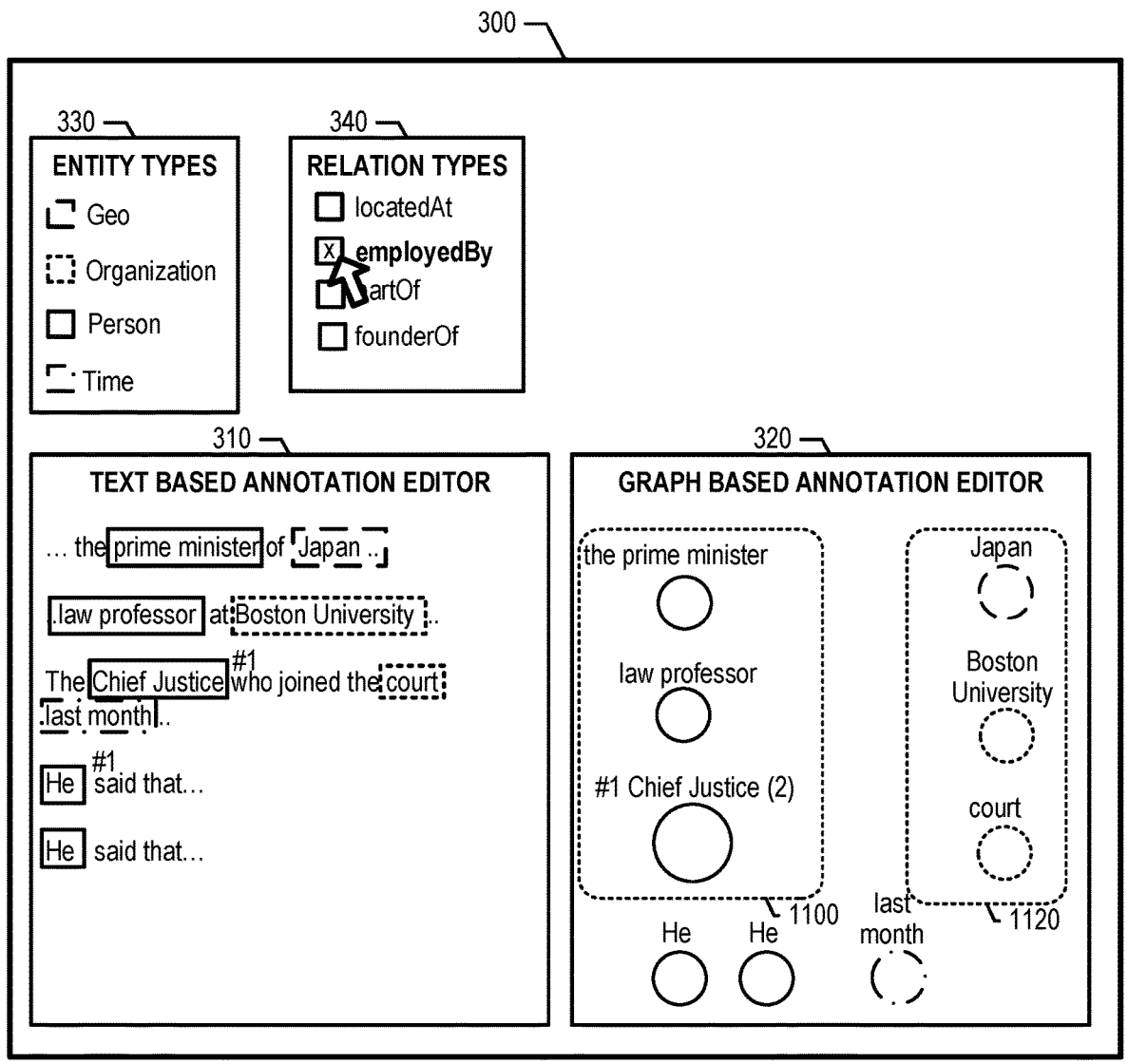
FIG. 11 is an exemplary diagram depicting a user selecting a relation type to initiate a process of adding relation annotations to entities.

At step 1030, the process identifies a first entity type and a second entity type of the selected relation type and, at step 1040, the process places entity nodes of the first entity type on one side of graph-based annotation editor 320 and place entity nodes of the second entity type on the other side of graph-based annotation editor 320 (see FIG. 11, types 1100-1120, and corresponding text for further details).

Figure 12:
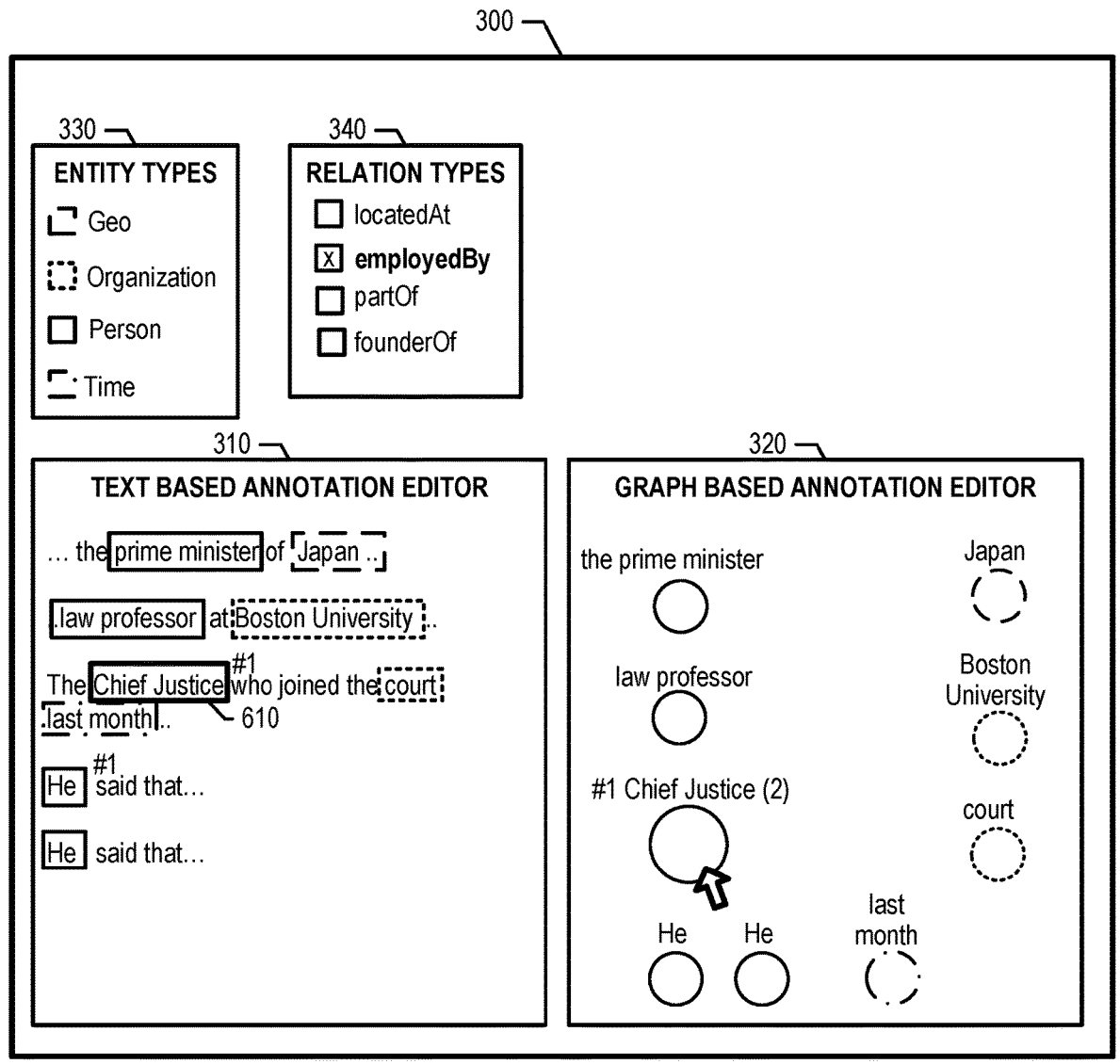
FIG. 12 is an exemplary diagram depicting a user selecting a node to add a relation annotation.
Figure 13:
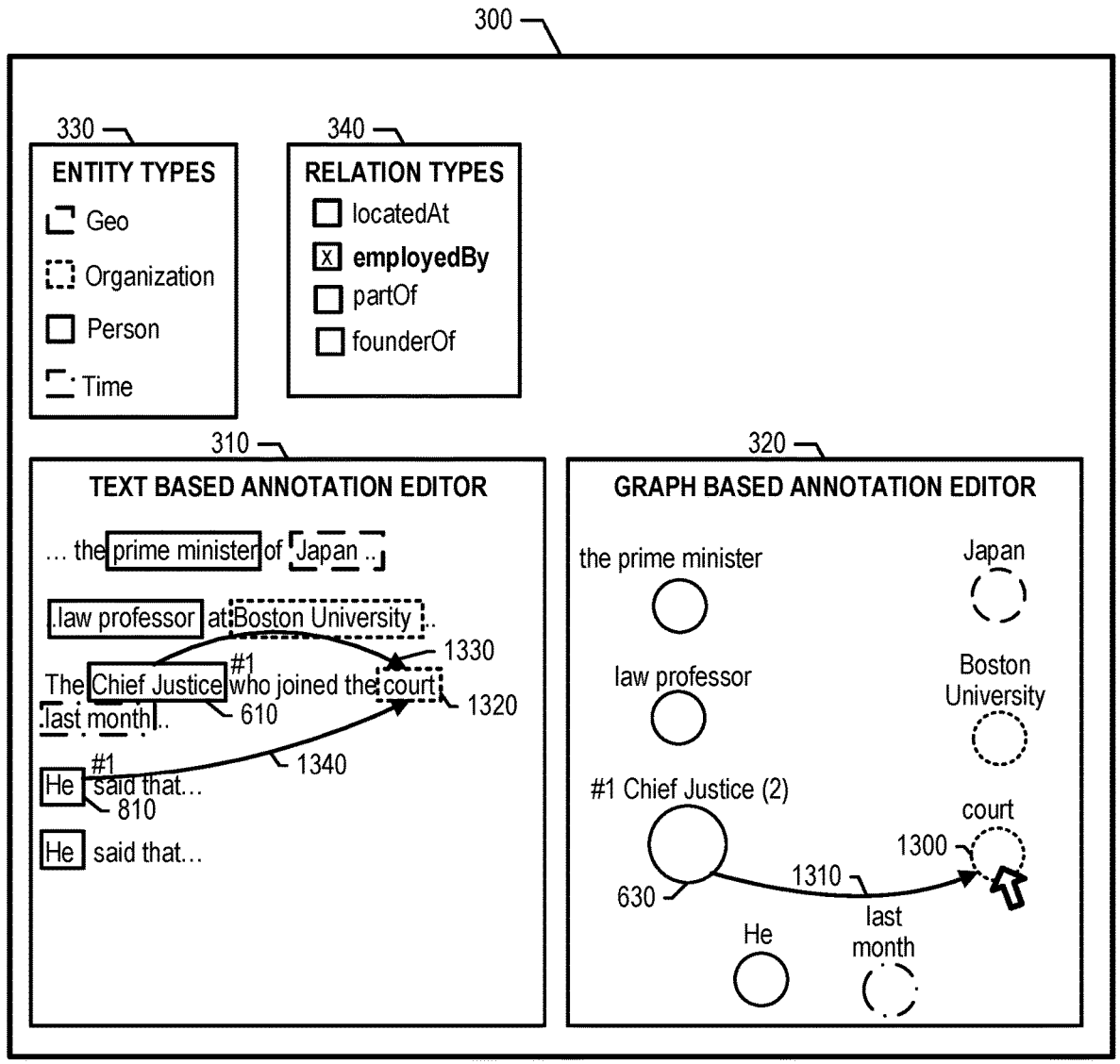
FIG. 13 is an exemplary diagram depicting a user selecting a node to apply a relation annotation.

At step 1050, the process receives a user selection that selects one of the first entity types and one of the second entity types (see FIGS. 12, 13, and corresponding text for further details). At step 1060, the process adds the selected relation type annotation between the selected first entity and the selected second entity in both graph-based annotation editor 320 and text-based annotation editor 310 accordingly (see FIG. 13, and corresponding text for further details).

The process determines as to whether continue (decision 1070). If the process should continue, then decision 1070 branches to the 'yes' branch which loops back to wait for additional user input. This looping continues until the process should terminate, at which point decision 1070 branches to the 'no' branch exiting the loop. FIG. 10 processing thereafter ends at 1080.

FIG. 11 is an exemplary diagram depicting a user selecting a relation type to initiate a process of adding relation annotations to entities. FIG. 11 shows that the user selected a relation type "employedBy" from relation types 340. As such, graph-based annotation editor 320 (via relation editor 370) places nodes that appear to have a "employedBy" relation on the left (area 1100) and right (area 1120) sides of graph-based annotation editor 320. In addition, nodes whose entities exist in the same sentence are placed near each other because they are more likely to have relation. The user then evaluates the nodes, along with the text in text-based annotation editor 310, to determine which nodes to add a relation annotation (see FIGS. 12, 13, and corresponding text for further details).

FIG. 12 is an exemplary diagram depicting a user selecting a node to add a relation annotation. When the user selects "Chief Justice" (node 630 or entity 610) using text-based annotation editor 310 or graph-based annotation editor 320, the selection is immediately applied to both editors. The "Chief Justice" entity 610 moves to the center text-based annotation editor 310 so that the user can view the entity's corresponding sentence, which enables the user to check the context in the text while selecting a corresponding relation node in graph-based annotation editor 320 (see FIG. 13 and corresponding text for further details).

FIG. 13 is an exemplary diagram depicting a user selecting a node to apply a relation annotation. When a user selects two entity nodes in graph-based annotation editor 320 or text-based annotation editor 310 and draws a relation between them, the relation is immediately drawn in the other editor as well. Advanced annotation system 350 also automatically adds relations to all entity mentions in the same co-reference chain.

FIG. 13 shows that when the user selects node 1300, graph-based annotation editor 320 adds relation 1310 between Chief Justice node 630 and court node 1300. In addition, text-based annotation editor 310 adds relation 1330 between Chief Justice entity 610 and court entity 1320. Keeping in mind that Chief Justice node 630 includes two nodes (Chief Justice and He), text-based annotation editor 310 also adds relation 1340 between He entity 810 and court entity 1320.

Figure 14:
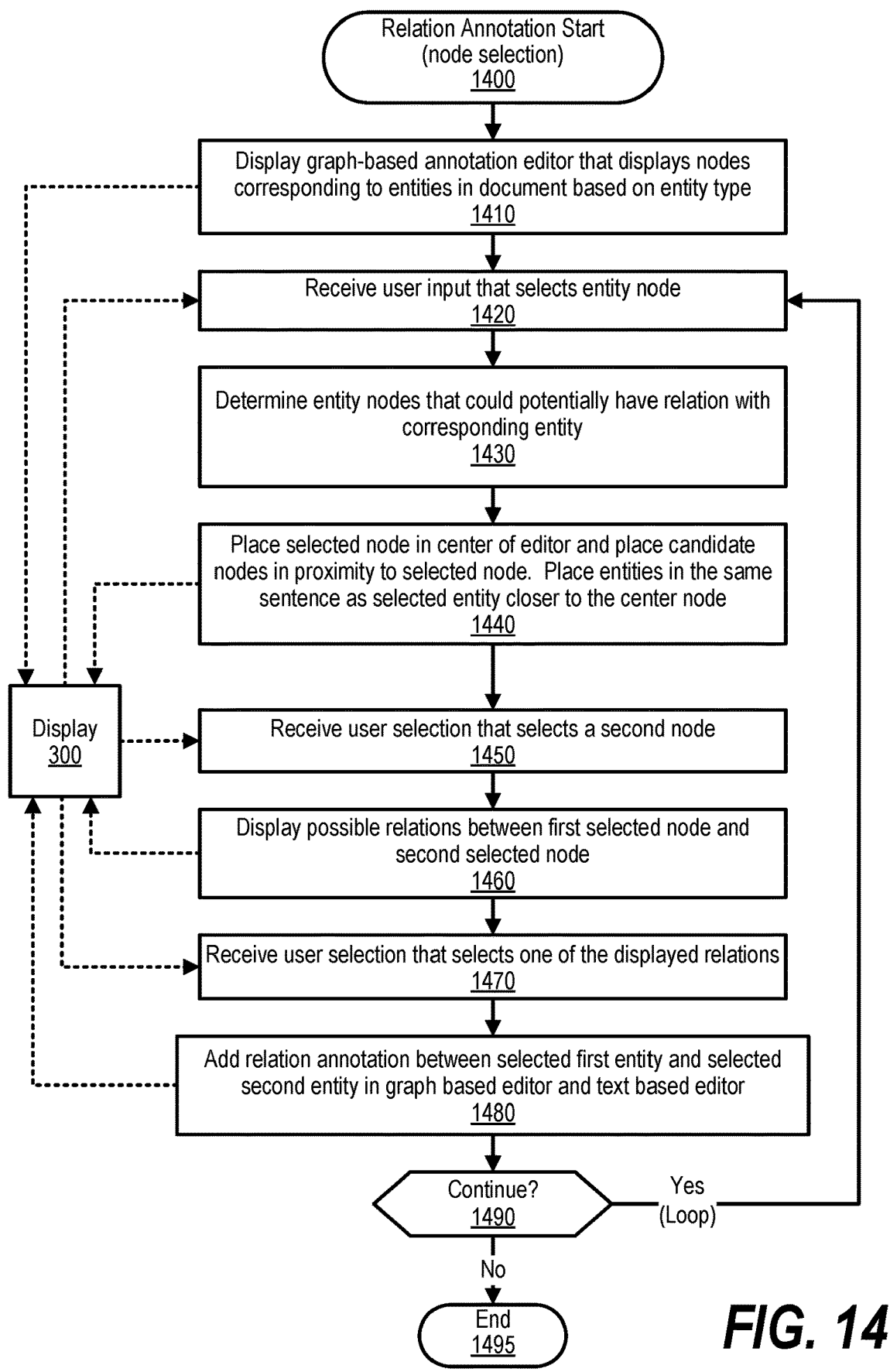
FIG. 14 is an exemplary flowchart depicting steps taken by an advanced annotation system to add relation annotations when a user selects a node.

FIG. 14 is an exemplary flowchart depicting steps taken by advanced annotation system 350 to add relation annotations when a user selects a node. FIG. 14 processing commences at 1400 whereupon, at step 1410, the process displays graph-based annotation editor 320 that displays nodes corresponding to entities in a document that are based on entity type. At step 1420, the process receives a user input that selects an entity in text-based annotation editor 310 or a node in graph-based annotation editor 320 (see FIG. 15 and corresponding text for further details). At step 1430, the process determines entities that could potentially have a relation with the selected entity/node.

At step 1440, the process moves the selected node into the center of graph-based annotation editor 320 and places the candidate nodes in proximity to the selected node. In addition, the process places entities in the same sentence as the selected entity closer to the center node. At step 1450, the process receives a user selection that selects a second entity (see FIG. 16 and corresponding text for further details).

Figure 17:
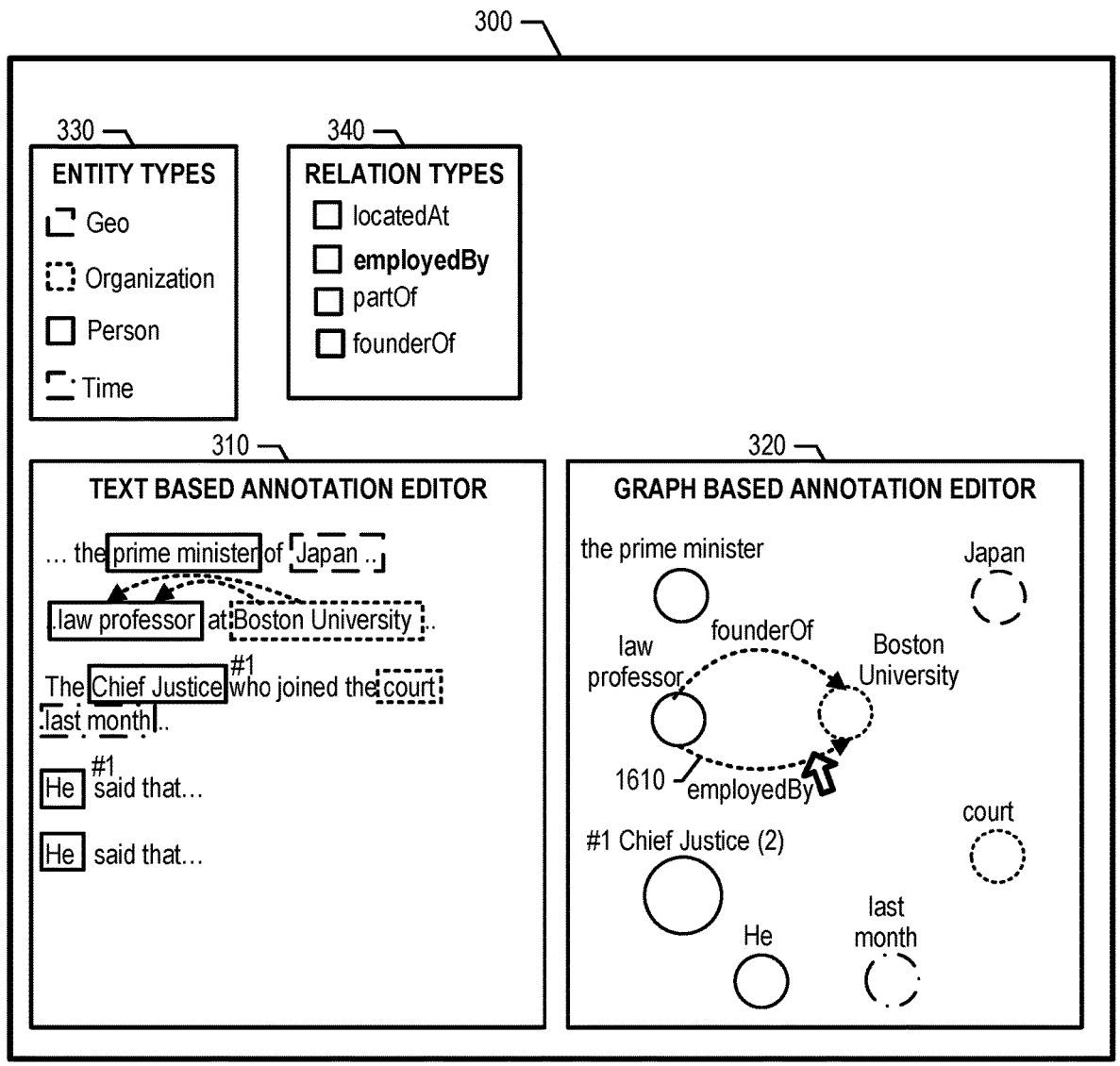
FIG. 17 is an exemplary diagram depicting a user selecting a relation between two previously selected nodes.

At step 1460, the process overlays possible relations between the first selected entity and the second selected entity and, at step 1470, the process receives a user selection that selects one of the overlaid relations (see FIG. 17 and corresponding text for further details). At step 1480, the process adds a relation annotation between the selected first entity and the selected second entity in graph-based annotation editor 320 and text-based annotation editor 310.

The process determines as to whether to continue (decision 1490). If the process should continue, then decision 1490 branches to the 'yes' branch which loops back to wait for more user input. This looping continues until the process should terminate, at which point decision 1490 branches to the 'no' branch exiting the loop. FIG. 14 processing thereafter ends at 1495.

Figure 15:
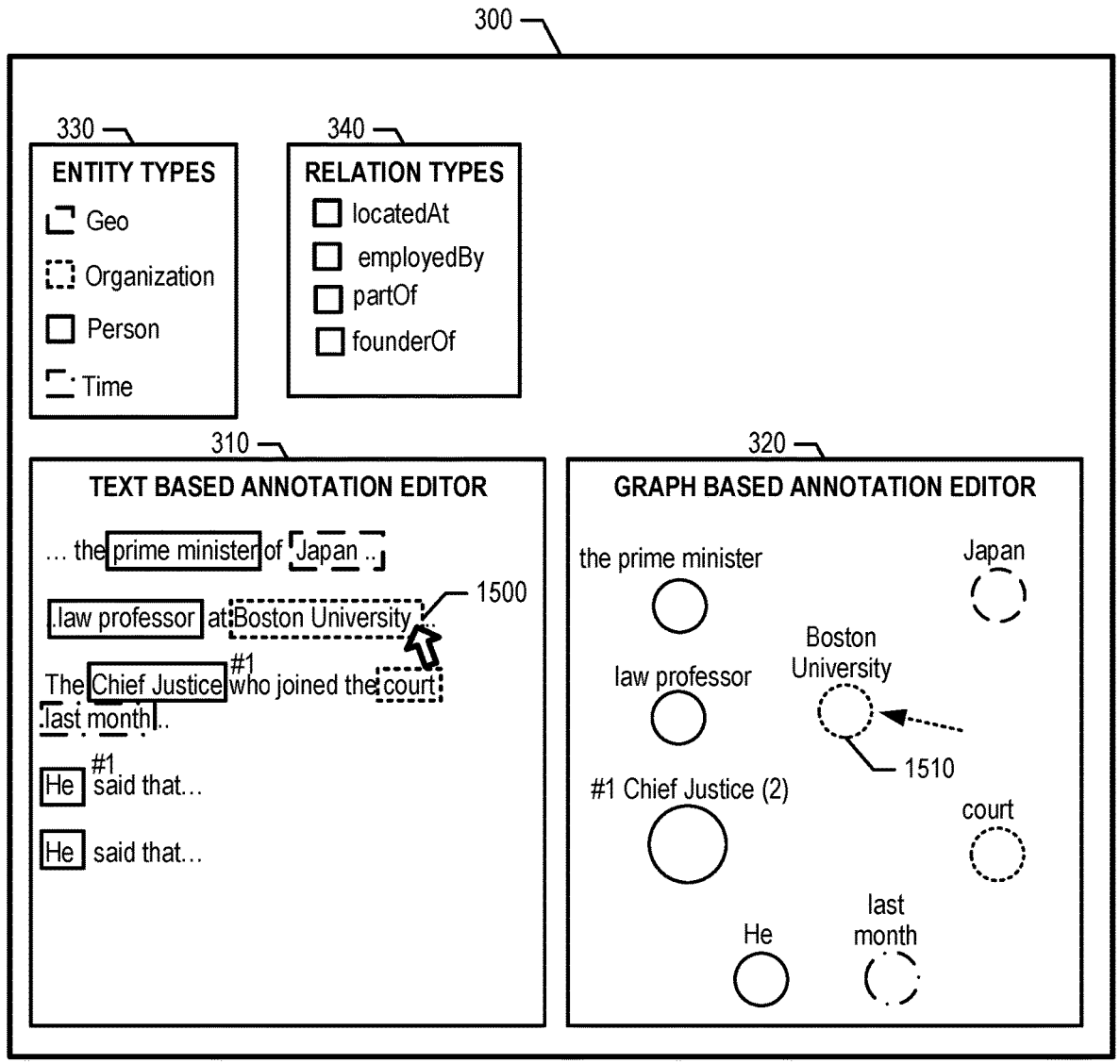
FIG. 15 is an exemplary diagram depicting a user selecting an entity to initiate a relation annotation process.

FIG. 15 is an exemplary diagram depicting a user selecting an entity to initiate a relation annotation process. When an entity or node is selected in either text-based annotation editor 310 or graph-based annotation editor 320, the entity (1500) and node (1510) are placed in the center of their respective editors. In addition, regarding graph-based annotation editor 320, nodes that could potentially have a relation with the selected entity or node are placed in proximity to the selected node to graphically display possible relations. In one embodiment, entities that are in the same sentence as the selected entity are also placed closer to the selected node in the graph because they are more likely to have a relation.

Figure 16:
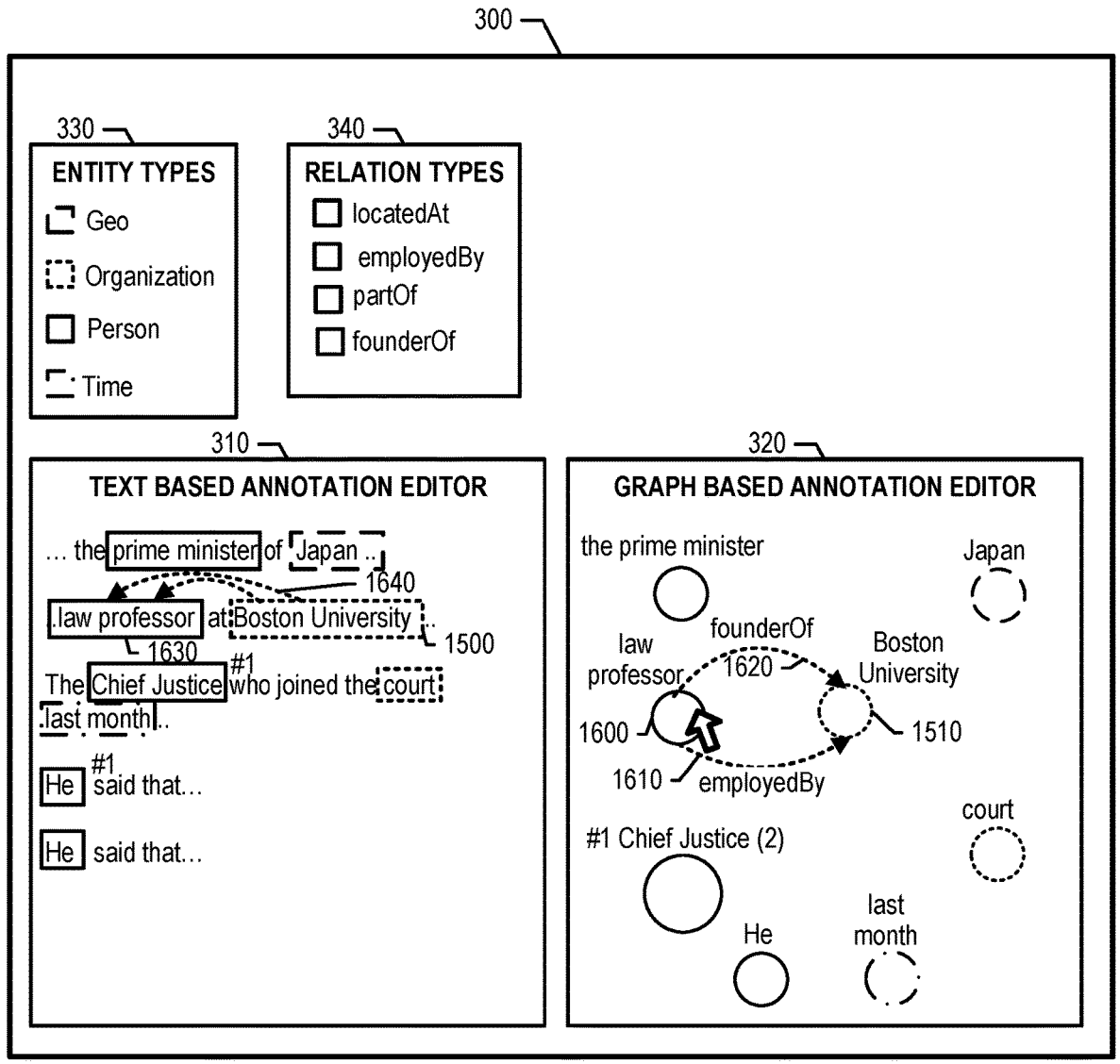
FIG. 16 is an exemplary diagram depicting a user selecting a node to assign a relation to a previously selected node.

FIG. 16 is an exemplary diagram depicting a user selecting a node to assign a relation to a previously selected node. When a user selects node "law professor" 1600 (corresponds to entity 1630), all potential relation types between "law professor" and the originally selected entity "Boston University" are shown in both graph-based annotation editor 320 (1610, 1620) and text-based annotation editor 310 (1640). At this point, the user is able to view graph-based annotation editor 320 to select the appropriate relation type (see FIG. 17 and corresponding text for further details).

FIG. 17 is an exemplary diagram depicting a user selecting a relation between two previously selected nodes. The user selects the "employed by" relation 1610 and, as such, advanced annotation system 350 adds the relation annotation to both text-based annotation editor 310 and graph-based annotation editor 320 accordingly.

Figure 18:
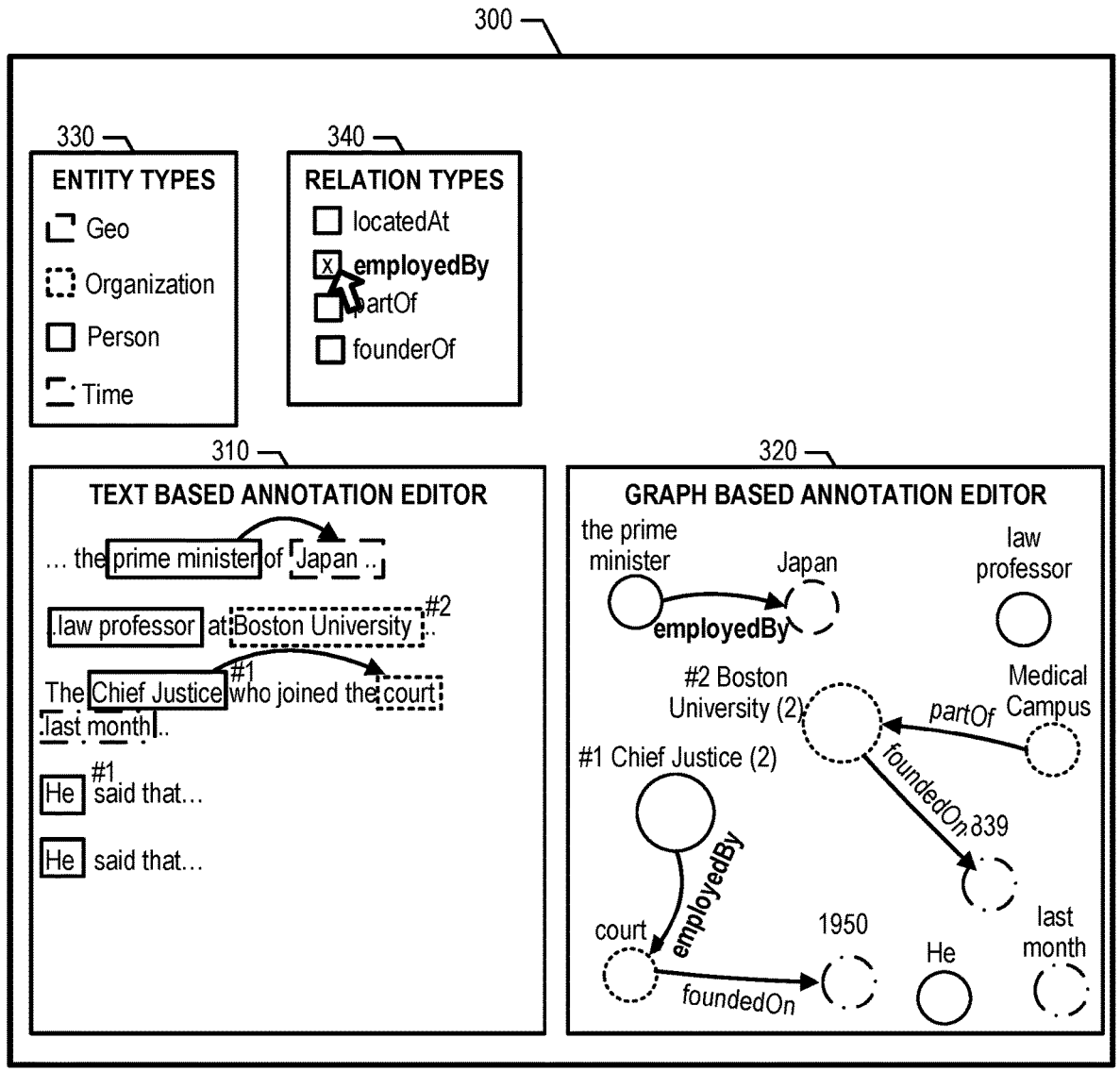
FIG. 18 is an exemplary diagram depicting an embodiment of a text-based annotation editor and a graph-based annotation editor displaying information when a portion of annotations already exist within the document text.

FIG. 18 is an exemplary diagram depicting an embodiment of text-based annotation editor 310 and graph-based annotation editor 320 displaying information when a portion of annotations already exist within the document text. In addition to the entities and relations that are related to a current action (employedBy selection), all other existing annotations are shown on graph-based annotation editor 320 in the background. This allows the user to view how much annotations the user has entered to the entire document and identify missing annotations.

Figure 19:
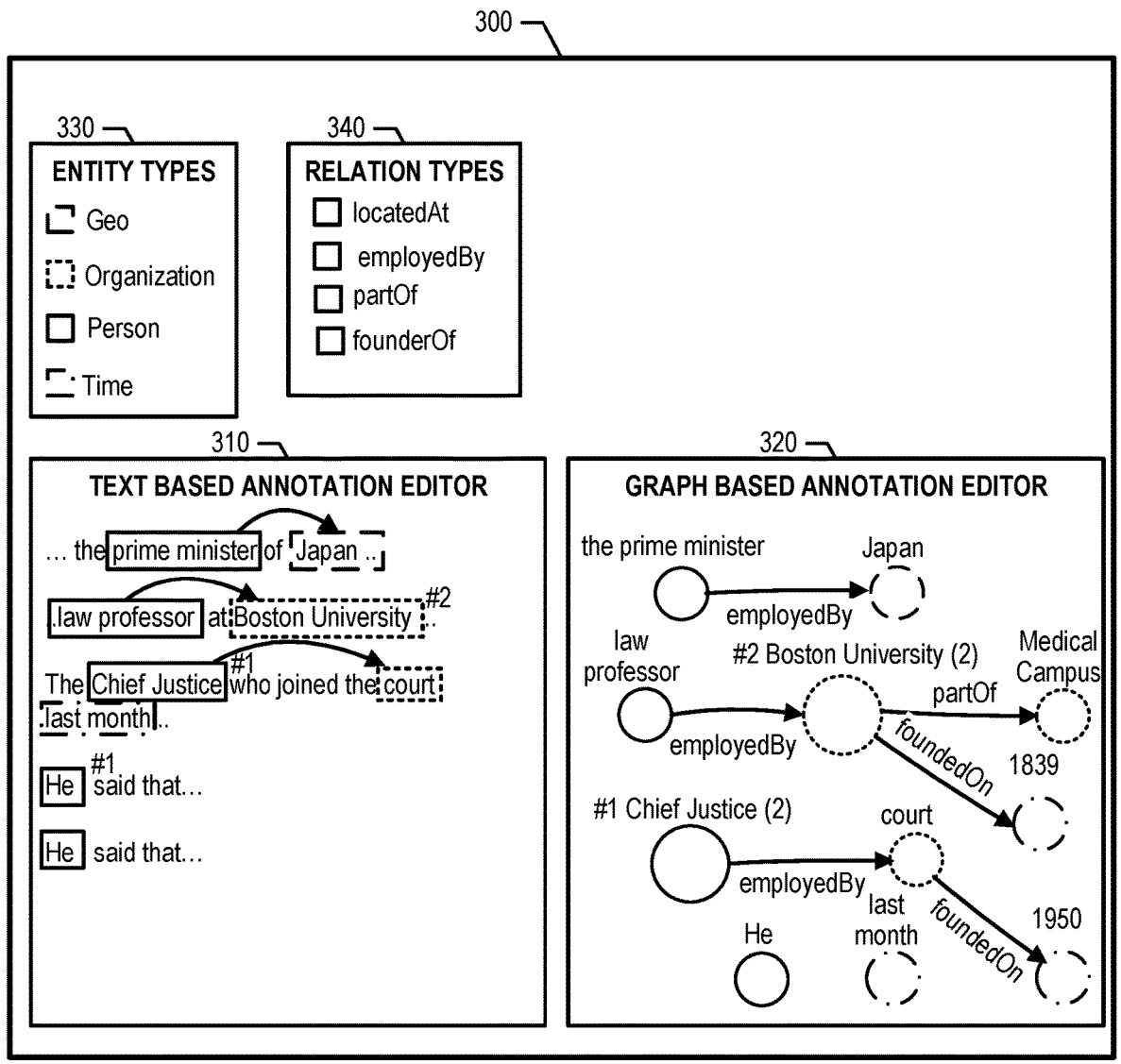
FIG. 19 is an exemplary diagram depicting an embodiment of a text-based annotation editor and a graph-based annotation editor displaying information when some annotations already exist and no action is selected.

FIG. 19 is an exemplary diagram depicting an embodiment of text-based annotation editor 310 and graph-based annotation editor 320 displaying information when some annotations already exist and no action is selected. FIG. 19 shows that a user can view an annotation summary of the entire document. Graph-based annotation editor 320 shows a cluster graph with each cluster representing a series of related entities, which allows the user to easily identify missing annotations. Text-based annotation editor 310 shows a few relations for simplicity purposes but, in one embodiment, shows each of the relations that are depicted in graph-based annotation editor 320.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    displaying a graphical editor and a text editor concurrently on a display, wherein the text editor displays a document text comprising a plurality of entities and the graphical editor displays a plurality of nodes corresponding to the plurality of entities;
    in response to receiving a user selection on the graphical editor that selects a first one of the plurality of nodes:
        identifying, based on the document text, one or more second nodes in the plurality of nodes that correspond to the first node; and
        repositioning the one or more second nodes to a second position on the graphical editor based on a first position of the first node.

2. The method of claim 1 further comprising:
    highlighting one or more of the plurality of nodes based on an entity type of their corresponding one or more of the plurality of entities.

3. The method of claim 1 further comprising:
    identifying one or more third nodes in the plurality of nodes that are unrelated to the first node; and
    repositioning the one or more third nodes away from the first node.

4. The method of claim 1 further comprising:
    in response to repositioning the one or more second nodes to the second position:
        receiving a co-reference selection corresponding to a selected one of the one or more second nodes;
        combining the selected second node with the first node on the graphical editor;
        overlaying an indicator proximate to the first node that indicates the second node is combined with the first node; and
        overlaying an indicator on the text editor that indicates a relationship between the first entity and a second one of the plurality of entities corresponding to the selected second node.

5. The method of claim 1 wherein the user selection is a relation type selection corresponding to a first entity type and a second entity type of the plurality of entities, the method further comprising:
    identifying a first set of the plurality of nodes corresponding to the first entity type, the first node included in the first set of nodes;
    identifying a second set of the plurality of nodes corresponding to the second entity type, the one or more second nodes included in the second set of nodes; and
    positioning the first set of nodes on a first area of the graphical editor and positioning the second set of nodes on a second area of the graphical editor that is different from the first area.

6. The method of claim 1 further comprising:
    identifying a first one of the plurality of entities that corresponds to the first node;
    locating a sentence in the document text that comprises the first entity, wherein the sentence also comprises one or more second entities of the plurality of entities; and
    determining that at least one of the one or more second nodes corresponds to at least one of the one or more second entities.

7. The method of claim 1 further comprising:
    displaying a plurality of graphical relations on the graphical editor that identifies a plurality of different relations between the first node and a set of the plurality of nodes.

8. An information handling system comprising:
    one or more processors;
    a memory coupled to at least one of the processors;
    a set of computer program instructions stored in the memory and executed by at least one of the processors in order to perform actions of:
        displaying a graphical editor and a text editor concurrently on a display, wherein the text editor displays a document text comprising a plurality of entities and the graphical editor displays a plurality of nodes corresponding to the plurality of entities;
        in response to receiving a user selection on the graphical editor that selects a first one of the plurality of nodes:
            identifying, based on the document text, one or more second nodes in the plurality of nodes that correspond to the first node; and
            repositioning the one or more second nodes to a second position on the graphical editor based on a first position of the first node.

9. The information handling system of claim 8 wherein the processors perform additional actions comprising:
    highlighting one or more of the plurality of nodes based on an entity type of their corresponding one or more of the plurality of entities.

10. The information handling system of claim 8 wherein the processors perform additional actions comprising:
    identifying one or more third nodes in the plurality of nodes that are unrelated to the first node; and
    repositioning the one or more third nodes away from the first node.

11. The information handling system of claim 8 wherein the processors perform additional actions comprising:
    in response to repositioning the one or more second nodes to the second position:
        receiving a co-reference selection corresponding to a selected one of the one or more second nodes;
        combining the selected second node with the first node on the graphical editor;
        overlaying an indicator proximate to the first node that indicates the second node is combined with the first node; and
        overlaying an indicator on the text editor that indicates a relationship between the first entity and a second one of the plurality of entities corresponding to the selected second node.

12. The information handling system of claim 8 wherein the user selection is a relation type selection corresponding to a first entity type and a second entity type of the plurality of entities, and wherein the processors perform additional actions comprising:

identifying a first set of the plurality of nodes corresponding to the first entity type, the first node included in the first set of nodes;

identifying a second set of the plurality of nodes corresponding to the second entity type, the one or more second nodes included in the second set of nodes; and positioning the first set of nodes on a first area of the graphical editor and positioning the second set of nodes on a second area of the graphical editor that is different from the first area.

13. The information handling system of claim 8 wherein the processors perform additional actions comprising:

identifying a first one of the plurality of entities that corresponds to the first node;

locating a sentence in the document text that comprises the first entity, wherein the sentence also comprises one or more second entities of the plurality of entities; and determining that at least one of the one or more second nodes corresponds to at least one of the one or more second entities.

14. The information handling system of claim 8 wherein the processors perform additional actions comprising:

displaying a plurality of graphical relations on the graphical editor that identifies a plurality of different relations between the first node and a set of the plurality of nodes.

15. A computer program product stored in a non-transitory computer readable storage medium, comprising computer program code that, when executed by an information handling system, causes the information handling system to perform actions comprising:

displaying a graphical editor and a text editor concurrently on a display, wherein the text editor displays a document text comprising a plurality of entities and the graphical editor displays a plurality of nodes corresponding to the plurality of entities;

in response to receiving a user selection on the graphical editor that selects a first one of the plurality of nodes:

identifying, based on the document text, one or more second nodes in the plurality of nodes that correspond to the first node; and repositioning the one or more second nodes to a second position on the graphical editor based on a first position of the first node.

16. The computer program product of claim 15 wherein the information handling system performs further actions comprising:

highlighting one or more of the plurality of nodes based on an entity type of their corresponding one or more of the plurality of entities.

17. The computer program product of claim 15 wherein the information handling system performs further actions comprising:

identifying one or more third nodes in the plurality of nodes that are unrelated to the first node; and repositioning the one or more third nodes away from the first node.

18. The computer program product of claim 15 wherein the information handling system performs further actions comprising:

in response to repositioning the one or more second nodes to the second position:

receiving a co-reference selection corresponding to a selected one of the one or more second nodes;

combining the selected second node with the first node on the graphical editor;

overlaying an indicator proximate to the first node that indicates the second node is combined with the first node; and overlaying an indicator on the text editor that indicates a relationship between the first entity and a second one of the plurality of entities corresponding to the selected second node.

19. The computer program product of claim 15 wherein the user selection is a relation type selection corresponding to a first entity type and a second entity type of the plurality of entities, and wherein the information handling system performs further actions comprising:

identifying a first set of the plurality of nodes corresponding to the first entity type, the first node included in the first set of nodes;

identifying a second set of the plurality of nodes corresponding to the second entity type, the one or more second nodes included in the second set of nodes; and positioning the first set of nodes on a first area of the graphical editor and positioning the second set of nodes on a second area of the graphical editor that is different from the first area.

20. The computer program product of claim 15 wherein the information handling system performs further actions comprising:

identifying a first one of the plurality of entities that corresponds to the first node;

locating a sentence in the document text that comprises the first entity, wherein the sentence also comprises one or more second entities of the plurality of entities; and determining that at least one of the one or more second nodes corresponds to at least one of the one or more second entities.

* * * * *